July 19, 1932.  F. H. MAYOH  1,867,979
WELDING MACHINE FOR MACHINE CONSTRUCTIONS AND THE LIKE
Filed Jan. 31, 1928   3 Sheets-Sheet 1
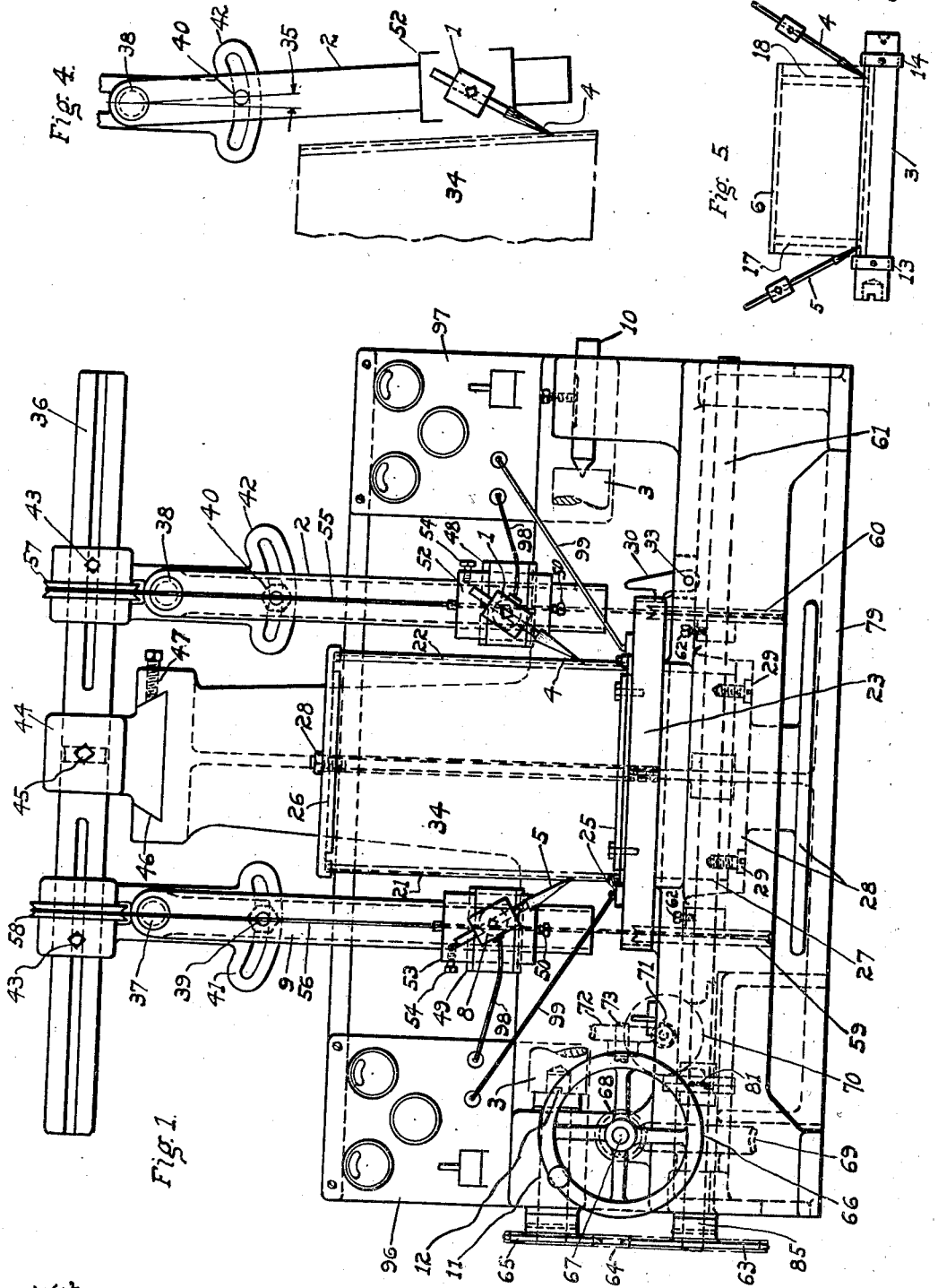
Witnesses;
Francis W Dezalia
Hilda Mayoh
Inventor;
Frank H. Mayoh.

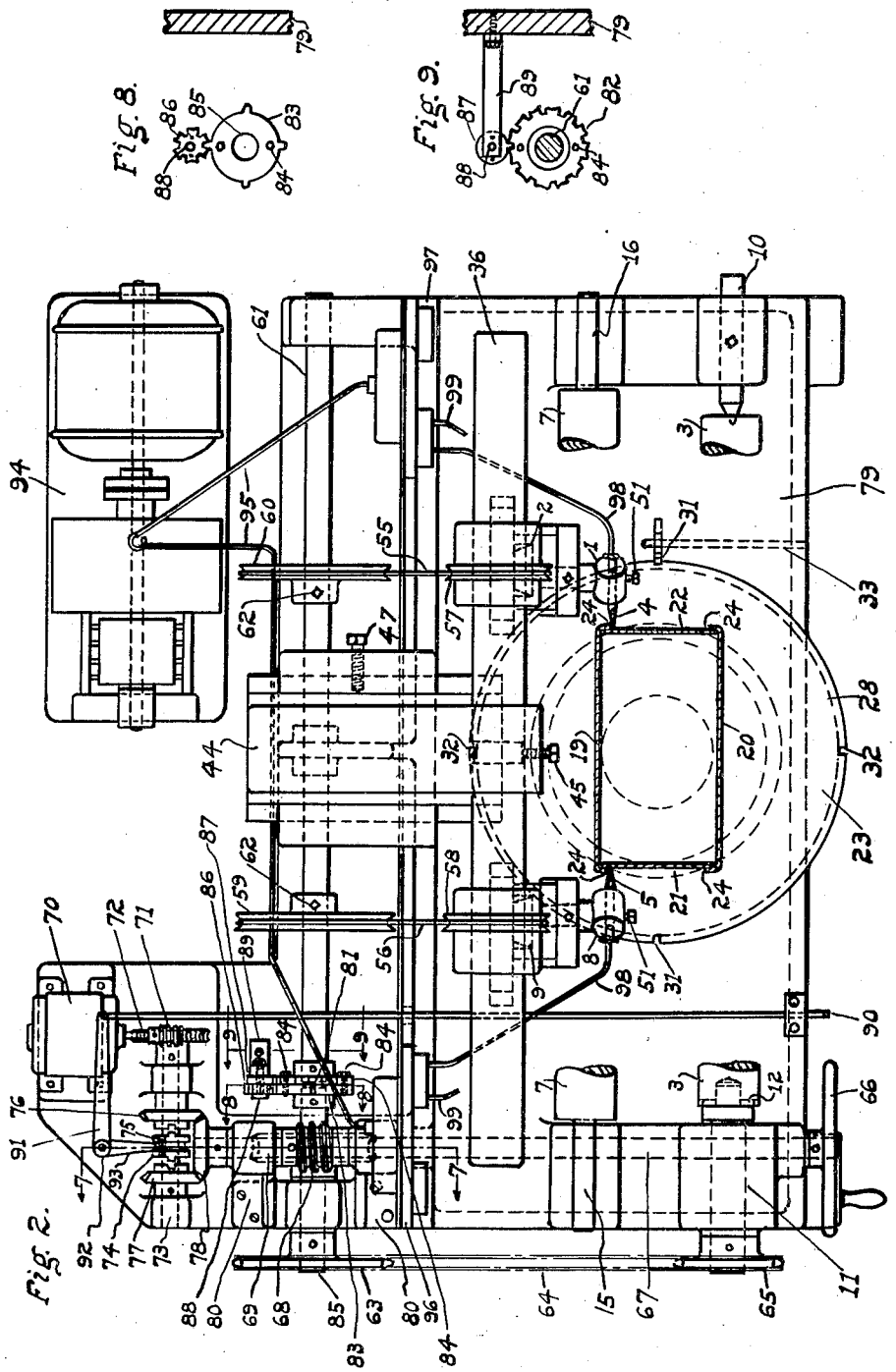

July 19, 1932.  F. H. MAYOH  1,867,979
WELDING MACHINE FOR MACHINE CONSTRUCTIONS AND THE LIKE
Filed Jan. 31, 1928  3 Sheets-Sheet 3
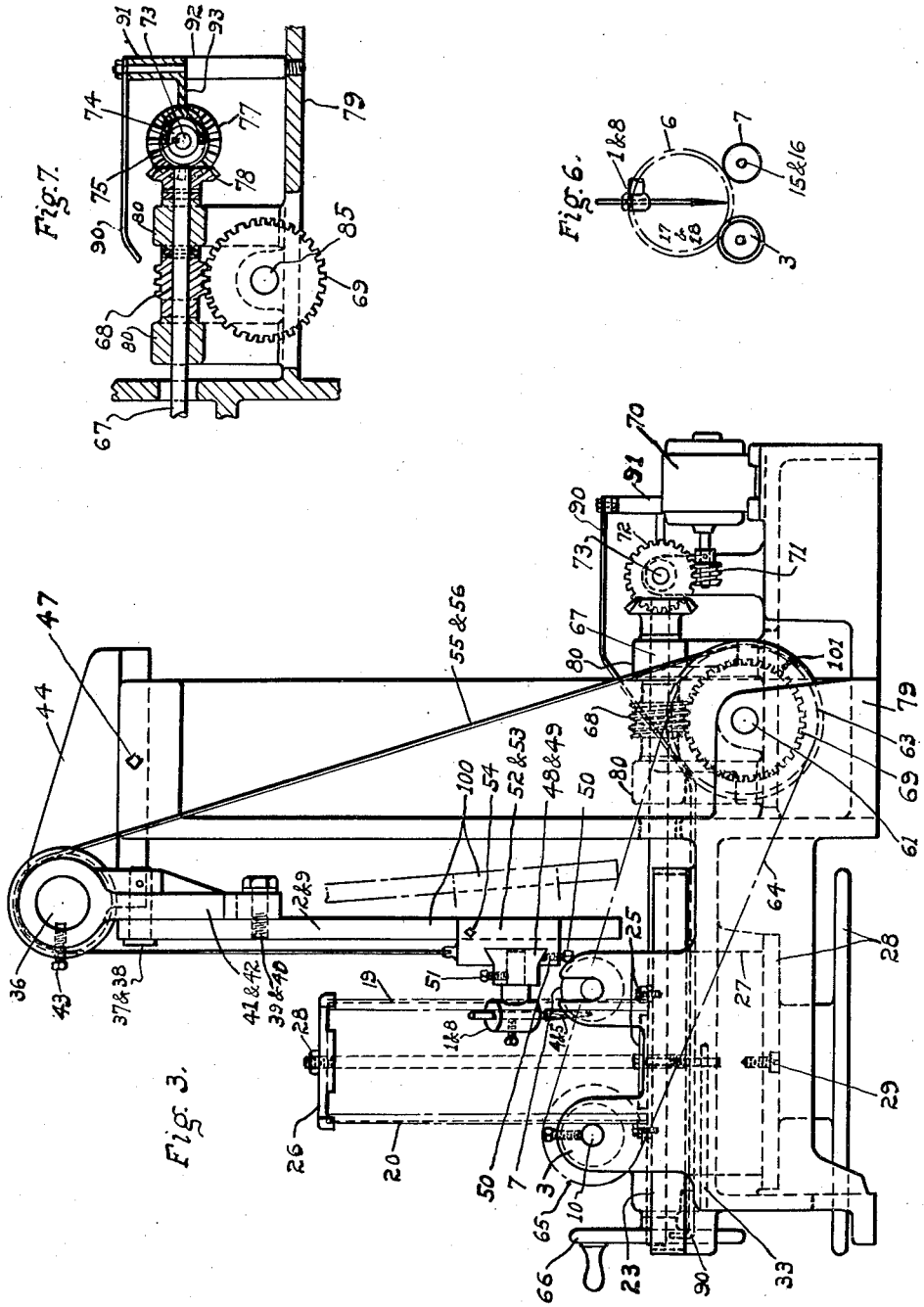
Witnesses;
Francis W Dezalia
Hilda Mayoh
Inventor;
Frank H. Mayoh.

Patented July 19, 1932

1,867,979

UNITED STATES PATENT OFFICE

FRANK H. MAYOH, OF SPRINGFIELD, MASSACHUSETTS

WELDING MACHINE FOR MACHINE CONSTRUCTIONS AND THE LIKE

Application filed January 31, 1928. Serial No. 250,897.

This invention relates to methods and devices for welding a variety of machine constructions and its particular object is to provide a machine allowing one, two or more elements to be welded, and to be supported in confronting relation. It is an object of this invention to provide means whereby a seam on work can be traversed from end to end by a welding device and automatically welded. It is a further object of this machine to rotatably present by indexing a seam or plurality of seams to the welding medium. It is also an object of this invention to provide means to weld seams in various angular planes. It is likewise an object of this invention to weld rotatably either horizontally or vertically placed work. One of the most desirable features of this invention consists of a work revolving table which has for its object the bringing of a plurality of seams into the welding position successively by means of an indexing arrangement. By revolving this table continuously circular seams are welded. This invention also contemplates the providing of a rotatable spindle arrangement by means of which supporting rolls to hold work can be revolved. A further object of this invention is to provide mechanisms in conjunction with the welding medium which cause the material worked on to be cut or welded in a horizontal, circular, vertical or in various angular planes by the application of heat, thereby producing a machine practically universal in its scope, for the purpose of constructing machine columns, welding the ends in rolls, making box structures or producing other obvious machine and metal constructions. To these ends it is an object of this invention to provide means whereby suitable welding apparatus preferably of the arc welding type can be mechanically controlled, particularly the welding electrode where the arc of electric contact is made or the gas torch, or any other preferred welding medium. A further object of the invention while not essential to the broad application of the same consists of two welding medium holders and control units incorporated in this machine; these are hereby known as right hand holder and left hand holder. However it is not proposed to limit this invention to a machine embodying two holders as one, two or more holders of the same general purport can be used although the preferred machine construction illustrates two.

The preferred form of the invention is illustrated in the drawings forming a part of this specification.

Figure 1 is a front elevation of the machine.

Figure 2 is a plan view of the same.

Figure 3 is an end view of the same.

Figure 4 is a partial front view showing the right hand welding medium holder 1 and slide carrier 2 in the front elevation swung at an angle for the purpose of welding seams on an angular plane.

Figure 5 is a front view showing roll 3 in Figure 1 supporting a cylinder 6 which is work to be welded.

Figure 6 is a side view of the structure shown in Figure 5, rolls 3 and 7 being also shown in Figure 3.

Figure 7 is an end section taken on line 7—7 through Figure 2 to illustrate the drive and clutch control.

Figure 8 is a sectional end view on line 8—8 in Figure 2.

Figure 9 is a sectional end view on line 9—9 in Figure 2. These last two views show an intermittent gear movement that is an auxiliary mechanism that may or may not be used as found desirable.

In the drawings 1 and 8 are the welding electrode holders, right and left hand respectively, 2 and 9 are slide arms that may be held perpendicular as shown in Fig. 1 or that may be swung to various angular positions as shown in Fig. 4. The front roll 3 is mounted on a center 10 and on a driving spindle 11 which has a tongue 12 as part thereof that enters a groove in the roll 3. This roll has two collars 13 and 14 that locate endways work 6 which is mounted on said roll 3 and a co-acting roll 7 as indicated in Figs 5 and 6. Roll 7 has a reduced portion on both ends 15 and 16. These enter slots in the frame of the machine. Roll 3 and roll 7 are removably mounted and are only used when work of a cylindrical nature is to be welded of which 6 is an example thereof. This cylinder is supported thereon while the ends 17 and 18 are welded therein by electrodes 4 and 5 held in holders 1 and 8, the work being revolved at that time as will be further described.

Another example of work held and welded on this machine is the rectangular machine column shown in Figs. 1, 2 and 3 of which 19 and 20 are the sides, 21 and 22 are the ends, these are held on table 23 while the four seams 24 are welded by electrodes 4 and 5 which are caused to traverse up and down along the seam to perform the welding operation one welding on the up travel and the other on the down travel or both welding together. For the purpose of holding the parts of the column in alignment the table 23 has work guide plates 25 attached to it, while the upper ends of the several parts of the work are held in place by a plate 26. A long bolt with a nut 28 is used to attach the upper plate to the table of the machine and clamp the work in place. It will be evident that the electrodes 4 and 5 at one traverse up or down along the seams weld the two seams 24 shown at the rear in Fig. 2 (the slide arms being set at a slight angle to compensate for the burning away of the electrodes) and on certain kinds of work that would be all that is necessary, consequently for some classes of work the table could be a stationary member. However, in the preferred construction shown the table is made revolvable by having as a part thereof a cylindrical portion 27 that enters a hole in the frame of the machine, this has attached to it a large hand wheel 28 held in place by screws 29. The object of this construction is to permit the table to be revolved by an operator taking hold of the hand wheel and turning the same which allows the table to be revolved so that the two front seams 24 are brought into position so they in turn can be welded by the electrodes 4 and 5. These functions will be best understood by referring to Fig. 2.

To lock the revolvable table 23 in the two positions required for welding the work shown in position a locking finger 30 is provided. This enters either of the notches 31 when in the position shown and prevents the table from being accidentally turned while the seams are being welded. Two additional notches 32 are provided so that the table may be turned in any one of four positions as desired, or additional notches for other indexing combinations could obviously be provided. Locking finger 30 pivots on pin 33 and is so constructed that it hangs of its own weight either side of the center of the pin. Therefore, when it is pulled out of the notches, it will lay of its own weight against the right hand side of the hole in which it is secured thereby permitting the table to be turned freely by means of said hand wheel 28 without interference. Thus work laying flat on the table 23 can be welded or operated upon in a flat circular plane by either of the electrodes 4 and 5, or both as desired. In Fig. 4 is shown a one-half section of a column or piece of work 34 constructed in the same manner as the aforedescribed rectangular column except that its ends are tapered, it being narrower at the top than at the bottom. To weld this part the electrode 4 is caused to traverse along slide arm 2 at an angle from the vertical as indicated by 35. The left hand electrode 5 is also caused to operate in the same manner along the slide arm 9 to weld the other seam.

From the foregoing description it will have been noted that a method of welding four distinct types of work has been described, namely, welding ends in rolls, welding rectangular columns, welding columns having tapered ends and the welding of work in a flat circular plane by revolving the table. In addition work can be welded on combined angles. This is accomplished by having the slide arm 2 swung on an angle 35 as shown in Fig. 4 and in addition having it swung back on an angle as indicated by numeral 100—to the dot and dash lines around the supporting bar 36 as a center. This combination causes the electrodes, either 4 or 5, to traverse to the right or left and forward or back while being slid up and down on either slide arm 2 or 9 as desired, or both. Owing to the adaptability of the welding machine for machine constructions, and the like which comprises this invention to weld so many different classes of work and in so many planes of operation it is in effect a universal welding machine and other combinations of welding will suggest themselves to the users of the same within the art to which it appertains. Therefore it is not intended to limit the same to the doing of any one kind of work. One additional example of its adaptability is in the welding of spirals by arranging the gears that will be described later so that they revolve certain members in the desired relation to sliding or revolving units.

Slide arms 2 and 9 can be swung to either side of their vertical center being pivotally mounted on studs 37 and 38 and being clamped by bolts 39 and 40 at any position within the scope of the elongated slots shown in the swivel brackets 41 and 42. The brackets 41 and 42 are slidably mounted on arm 36 and are clamped in any position by screws 43, they being preferably held in radial alignment by the key-way shown in arm 36 although this is not a necessary part thereof. The entire mechanisms mounted on said swivel brackets 41 and 42 are pivotally mounted on a slidable holder 44 through the medium of bar 36 which is clamped in any radial position by screw 45. The entire holder 44 is free to slide back and forth being mounted in a dovetail slot 46 in the upper end of the frame of the machine and it is clamped in any position by screw 47.

To support the electrode holders 1 and 8 adjustable blocks 48 and 49 are provided. These are clamped by screws 50 after they are adjusted sideways to bring the electrodes 4 and 5 in proper contact with the work. These adjustable slide blocks 48 and 49 can be used to do longitudinal welding in a horizontal plane. It will be noted that electrode holders 1 and 8 are swively mounted in these slide blocks 48 and 49 being clamped thereto by screws 51. Said slide blocks 48 and 49 are in turn mounted in slides 52 and 53 which are caused to traverse along slide arms 1 and 9. Slides 52 and 53 are provided with screws 54 so that at the operator's convenience they may be locked in position at the slide arms. To slides 51 and 53 are attached cables 55 and 56. These cables pass over pulleys 57 and 58 and are attached to pulleys 59 and 60 by screws 101. Pulleys 59 and 60 are attached to shaft 61 by screws 62 and as these are caused to revolve the slides will be pulled up through the medium of the cables to weld the seams of the work.

By means of screws 62 the pulleys 59 and 60 may be slid along the shaft 61 or may be rotated so that the welding operation may be started at varying points horizontally and vertically and radially, after the operator sets the pulleys the screws are tightened so the pulleys revolve with the shaft. It will be evident from this description that the function of shaft 61 is to cause the electrodes 4 and 5 to be operated along the seams of the work when said shaft revolves. Attached to the left hand end of shaft 61 is a sprocket 63 and through the medium of chain 64 sprocket 65 is caused to revolve. This in turn drives spindle 11 which revolves roll 3 and causes work 6 in Fig. 5 to revolve when the nature of the work is such as to require the performance of this function. To enable the operator to conveniently adjust the machine by hand a hand wheel 66 is provided, this is attached to shaft 67, a worm 68 is pinned to said shaft. This worm meshes with a worm gear 69 and said worm gear is pinned to a shaft 85 which is a continuation of shaft 61 and rotates therewith. When the operator turns hand wheel 66 he revolves shaft 61 through the medium of the worm and gear to place the machine in adjustment or to do welding operations by hand.

It will be evident that to commercially weld, the operative mechanism of the machine at the welding point must move quite slowly and to some extent at different speeds. Consequently I have incorporated as a preferred construction to drive the machine a variable speed motor of any commercial type 70, which may be automatically regulated so its speed will synchronize with the requirements of the weld by means of electromagnetic control similar to some now in use. On the end of the motor shaft is a worm 71 which drives worm gear 72 thereby reducing the speed. Said worm gear is pinned to a short shaft 73 to which is slidably attached a clutch 74, a key 75 Fig. 7 drives the clutch; two beveled gears 76 and 77 revolve free on shaft 73. When the clutch is engaged with either one of said gears 76 or 77 it will drive one of the same and this in turn will drive gear 78 and cause shaft 67 to revolve as gear 78 is pinned to it. Shaft 67 now revolves worm 68 which drives worm gear 69 which in turn drives shaft 85 attached to shaft 61 and causes the machine to perform its various functions.

The mechanisms forming a part of the machine are mounted in a frame structure generally indicated as 79 with the shaft bearings forming a part thereof while separate bearings 80 in the form of brackets are used to support the worm shaft. When welding cylindrical work as shown in Figs. 5 and 6 it is usually desirable to have the electrodes 4 and 5 move downward slightly as the work is rotated to compensate for the burning away of the electrodes. To accomplish this reference is made to the construction shown in Figs. 8 and 9 which are also shown in the plan view Fig. 2, these may or may not be used as found desirable. Instead of shaft 61 being one continuous piece for its entire length it is cut apart as shown at 81 and has two members 82 and 83 pinned thereto, these are normally clamped together with two bolts 84 which cause both shafts to revolve as one unit. When welding said cylindrical work the two bolts 84 are removed, this allows the short shaft at the left 85 to revolve as driven through the medium of the worm and gears previously described thereby turning sprocket 63 which in turn revolves sprocket 65 through the medium of chain 64 to turn the driving rolls and work. Two intermittent gears 86 and 87 are pinned together and are mounted on a stud 88 in a bracket 89. Gear 86 is revolved intermittently by gear 83 and as 86 is pinned to 87 the one tooth on gear 87 in turn drives gear 82 intermittently. This drives the right hand portion 61 of the shaft at a very much reduced speed thereby causing the welding electrodes to be moved very slowly. Various combinations of reduction gearing could be used between these two shaft members thereby obtaining combinations suitable for the welding of spirals as well as the slow feed to compensate for the burning away of the electrodes.

Rod 90 is means whereby the machine operator moves lever 91 which pivots on a supporting stud 92. This operates yoke 93 which moves clutch 74 into engagement with either of bevel gears 76 or 77 so that the machine may be run in either direction or stopped when in an intermediate position as shown. The unit generally indicated by 94 consists of a motor driven generator set which can be any suitable commercial type. This provides the electric current which passes through wire cables 95 to control panels 96 and 97 which are likewise commercial units obtainable for arc welding. Through these control panels and wire cables 99 electric current passes to the work welded while wire cables 98 make contact with the welding electrodes to complete the arc welding circuit. These cables 99 have suitable contactors on their ends, all of these electric connections being well known to the arc welding art it being sufficient for the purpose of this invention to describe the operation of the same as follows. The electric current coming from the generator set 94 goes through suitable wiring to the panels 96 and 97 where the amount of electricity required is controlled by means of regulating instruments and switches.

The operator strikes the arc by advancing the electrodes to the work and withdrawing them to the proper welding distance while turning the handwheel to set his welding electrodes in welding position, after throwing his welding switches on. He then operates the clutch and the machine performs the several functions described. The slide arms are set to a suitable angle that will compensate for the burning away of the electrodes as they traverse along the seams being welded.

The welding electrode holders 1 and 8 may be of the automatic arc welding type in which a wire electrode is fed in such a manner as to automatically strike the arc and to maintain a substantially uniform arc during the movement of the holder.

In the preferred construction shown and described two welding units have been dealt with as a complete welding machine for machine constructions, and the like but it is not desired to limit this invention to a machine embodying two units as this machine will be complete in itself if only one unit were used or if more than two units were used, I am also aware that the machine can be constructed with the cylindrical welding roll unit or without the same and with or without the revolving table. I am also aware that the revolving table could be made as a stationary unit and that if made in any of these or similar construction it would still be an operative mechanism. It is therefore my purpose to claim as my invention the complete machine shown as preferred and likewise to claim as my invention sub-structures thereof, likewise I do not wish to limit this invention to use with arc welding apparatus but claim as my invention the various machine constructions when used with any commercial welding medium such as gas torch welding apparatus and therefore, wish it to be distinctly understood that this invention is not limited in its application to the specific structure described or to use in connection with arc welding machines.

What I claim is:

1. In a welding machine a welding head, a holding device for the article to be welded, means for moving either said head or holding device with respect to the other to progressively present different portions of the article to the welding head and means to vary the line of operation between said welding head and holding device in a plurality of directions at different tangents.

2. In a welding machine a plurality of welding heads adjustable to vary the direction of the weld at different tangents, a holding device for the articles to be welded, means for moving said plurality of heads with respect to the holding device to progressively present different portions of the articles to the welding head.

3. In a welding machine a welding head, a holding device for the article to be welded, guides and means for moving said head or said holding device with respect to the other comprising shaft ratio control mechanism adapted to synchronize the travel of said welding head to the movement of said holding device in a plurality of angular directions.

4. In a welding machine, a work supporting device, a welding head slidably affixed, operative means therefor consisting of drive mechanism and inter-co-actionable members to operate, guides to direct the welding contact of said welding head in a substantially vertical line and in a plurality of angularly disposed directions therefrom.

5. In a multiple function machine of the class described, welding head, guides pivotally adapted to direct the welding in a plurality of directions along a predetermined path of welding, a revolvable work supporting table and means to cause said table to revolve to contact said head with work mounted on said table.

6. A machine comprising a welding head, means to support work at a fixed position and means to vertically rotate work, a frame operative means consisting of drive mechanism and inter-co-actionable members. Structure including head guides to control the welding head at the point of contact with the work in a line adjustable in substantially all directions; all for the several purposes set forth.

7. A machine comprising a welding head with control apparatus, guide to govern at the point of contact the travel of said welding head having as part thereof travel direction positioning means, guide holding structure, welding head operating means consisting in part of driven head travel transmission units, a frame to retain the various mechanism in operative relationship, means to hold work in one of several positions substantially as described and revolving means therefor.

8. A machine comprising a plurality of welding heads with control apparatus, a plurality of welding head supporting holders, a plurality of guides, said guides being adjustably supported to direct the travel of said welding heads in a plurality of directions, guide holding structure, a frame, means to hold work in one of several positions consisting in part of revolvable unit, welding head feeding means consisting in part of transmission units.

9. In a multiple function welding machine, a plurality of pivotally supported welding heads adapted to direct the path of welding in a plurality of directions, means to drive said heads along the path of welding, a work holding table, a frame to support said table and heads.

10. A multiple function welding machine comprising a work holding table and a welding head, a retaining unit comprising angular adjusting means to govern the juxtapositioning of said welding head relative to the work, traversible alignment arm and head driving means adapted to direct the welding along a predetermined operating line, a supporting frame to retain the various mechanisms in operative relationship.

11. In a welding machine the combination of a work supporting member, welding head, slides to direct the traverse of said welding head along the welding line, arms pivotally mounted and adjustable brackets in co-engagement with a supporting guide bar for adjusting in substantially all directions said welding head, driven means to elevate and lower said welding head, means to adjust manually said welding head consisting in part of a hand-wheel, drive mechanism, frame to retain the various mechanisms in operative relationship.

12. In a welding machine the combination of a manually rotatable work supporting platen and a locking device intermittently actionable to locate said platen to weld in a plurality of fixed positions about its axis work mounted on said platen, a welding head and head guide means to support said head in contact with the juxtaposed work to be welded.

13. In a welding machine the combination of a welding head, a holding device for the article to be welded, means for moving one of these units with respect to the other to progressively present different portions of the article to the welding head and directional guide mechanism for varying in substantially all directions the path of traverse of said welding head along the welding path of the article welded.

14. In a welding machine, a plurality of welding heads, a plurality of holding devices for the articles to be welded, means for moving in a plurality of angular directions said welding heads and comprising mechanism to direct the path of traverse of the weld along the seam of the work.

15. In a welding machine, the combination of a work support and revolving means therefor, a welding head comprising an adjustable guide to direct the line of welding, clamping means to hold said guide to weld in a plurality of directions, a guide support having in a supporting frame structure, a supporting frame to retain in operative relationship said work support and said welding members.

16. In a welding machine the combination of a welding head, slides to direct the traverse of said welding head along the welding path in variable directions, slide carriers and supporting brackets therefor pivotally mounted, guide arms supporting said brackets; an adjustable guide arm support member, means to traverse said welding head along the path of contact consisting in part of cable and intermittent gear reduction unit; a work supporting table, a frame to retain the various mechanisms in alignment.

FRANK H. MAYOH.

CERTIFICATE OF CORRECTION.

Patent No. 1,867,979. July 19, 1932.

FRANK H. MAYOH.

It is hereby certified that error appears in the printed specification of the above numbered patent requiring correction as follows: Page 5, line 75, claim 15, after the word "having" insert the article and word a terminal; and that the said Letters Patent should be read with this correction therein that the same may conform to the record of the case in the Patent Office.

Signed and sealed this 18th day of October, A. D. 1932.

(Seal)

M. J. Moore,
Acting Commissioner of Patents.